United States Patent
Haug et al.

(10) Patent No.: US 9,448,807 B2
(45) Date of Patent: Sep. 20, 2016

(54) AUTOMATIC CREATION, DEPLOYMENT, AND UPGRADE OF DISK IMAGES

(71) Applicant: GLOBALFOUNDRIES INC., Grand Cayman (KY)

(72) Inventors: Walter Haug, Sindelfingen (DE); Steffen Hees, Hamburg (DE); Roland Seiffert, Herrenberg (DE); Stefan Letz, Boeblingen (DE); Jan-Bernd Themann, Tuebingen (DE)

(73) Assignee: GLOBAL FOUNDRIES INC., Grand Cayman (KY)

( * ) Notice: Subject to any disclaimer, the term of this patent is extended or adjusted under 35 U.S.C. 154(b) by 409 days.

(21) Appl. No.: 13/872,404

(22) Filed: Apr. 29, 2013

(65) Prior Publication Data

US 2014/0325140 A1    Oct. 30, 2014

(51) Int. Cl.
*G06F 9/44* (2006.01)
*G06F 9/445* (2006.01)

(52) U.S. Cl.
CPC ............... *G06F 9/4401* (2013.01); *G06F 8/63* (2013.01)

(58) Field of Classification Search
CPC ................................. G06F 9/4401; G06F 8/63
USPC .......................................................... 717/168
See application file for complete search history.

(56) References Cited

U.S. PATENT DOCUMENTS

| | | | |
|---|---|---|---|
| 7,356,679 B1 * | 4/2008 | Le ..................... | G06F 17/30067 717/176 |
| 7,624,262 B2 | 11/2009 | Diep et al. | |
| 7,757,228 B1 | 7/2010 | Eatough et al. | |
| 7,779,406 B2 | 8/2010 | Blanding et al. | |
| 7,802,084 B2 | 9/2010 | Fitzgerald et al. | |
| 8,176,482 B1 * | 5/2012 | Felix ......................... | G06F 8/63 717/168 |
| 8,209,680 B1 * | 6/2012 | Le ..................... | G06F 17/30067 717/174 |
| 8,244,827 B2 * | 8/2012 | Abrams ................ | G06F 9/4856 709/215 |
| 8,996,667 B2 * | 3/2015 | Clerc .................... | G06F 9/4416 709/222 |
| 2004/0187104 A1 | 9/2004 | Sardesai et al. | |
| 2006/0123386 A1 * | 6/2006 | Tameshige ................ | G06F 8/63 717/100 |
| 2007/0256070 A1 * | 11/2007 | Bykov ...................... | G06F 8/60 717/174 |
| 2008/0183837 A1 | 7/2008 | Lee et al. | |
| 2009/0105999 A1 * | 4/2009 | Gimpl .................... | G06F 9/5077 703/6 |
| 2009/0164660 A1 * | 6/2009 | Abrams ........................ | 709/236 |
| 2009/0300151 A1 | 12/2009 | Friedman et al. | |

(Continued)

OTHER PUBLICATIONS

IP.com, "Fast Application Provisioning for Cloud Computing" Nov. 15, 2010.*

(Continued)

*Primary Examiner* — Wei Zhen
*Assistant Examiner* — Junchun Wu
(74) *Attorney, Agent, or Firm* — DeLio, Peterson & Curcio, LLC; Kelly M. Nowak (57) ABSTRACT

A computer installs an operating system. The computer receives, in a logical partition (LPAR) via a management network, a deploy program configured to download a disk image from an image repository and to write the disk image to a first direct access storage device (DASD) of the LPAR. The disk image includes an operating system, applications, and management components including an upgrade program. The computer receives, in the LPAR via a data network, the disk image, and writes, to the first DASD of the LPAR, the disk image. The computer boots the LPAR into the operating system of the disk image written to the first DASD, and determines whether the installed operating system is a deployment or an upgrade.

20 Claims, 5 Drawing Sheets

(56) References Cited

U.S. PATENT DOCUMENTS

| | | | |
|---|---|---|---|
| 2009/0307685 A1* | 12/2009 | Axnix et al. | 717/174 |
| 2009/0328225 A1* | 12/2009 | Chambers et al. | 718/1 |
| 2010/0169881 A1* | 7/2010 | Silvera et al. | 718/1 |
| 2012/0030672 A1* | 2/2012 | Zygmuntowicz et al. | 718/1 |
| 2012/0042198 A1* | 2/2012 | Han | G06F 11/1433 714/4.21 |
| 2012/0144389 A1* | 6/2012 | Hicks | G06F 9/5088 718/1 |
| 2012/0291023 A1* | 11/2012 | Lu | G06F 9/4411 717/178 |
| 2012/0324446 A1* | 12/2012 | Fries | G06F 21/64 718/1 |
| 2013/0007739 A1* | 1/2013 | Poddar | G06F 8/63 718/1 |
| 2013/0139139 A1* | 5/2013 | Mallur | G06F 8/65 717/170 |

OTHER PUBLICATIONS

Park et al. "Capacity Planning for Logical Partitioning on the IBM Server", Oct. 2001, IBM.*
Thorat et al. "Offline Management in Virtualized Environments", Apr. 2013, Communication of the ACM, vol. 56, No. 4.*
Turk et al. "Virtual Linux servers under zVM—Security performance and administration issues", 2005, IBM Systems Journal, vol. 44, No. 2.*
Disclosed Ananymously; "Fast Application Provisioning for Cloud Computing"; IP.com Prior Art Database Technical Disclosure; Nov. 15, 2010; IPCOM000201588D; <http://priorartdatabase.com/IPCOM/000201588>.

* cited by examiner

AUTOMATIC CREATION, DEPLOYMENT, AND UPGRADE OF DISK IMAGES

FIELD OF THE INVENTION

The present invention relates generally to the creation, deployment, and upgrade of disk images, and more specifically to installation of such disk images onto logical partitions of a computing system.

BACKGROUND

A logical partition ("LPAR") may be created on a computer, such as a mainframe computer in a data center. An LPAR may be considered a virtual machine. Traditionally, an LPAR is created by allocating a processor, memory, dedicated input/output ("I/O") devices, and at least one Direct Access Storage Device ("DASD," e.g., a hard disk drive, etc.) that are within or that are physically attached to the computer. The computer includes enough physical resources to support a plurality of LPARs. An LPAR is booted from the DASD, which contains a disk image of an operating system that runs on the LPAR.

An LPAR can be managed over a dedicated management network from a support element connected to the computer hosting the LPAR. The support element can be a second computer, such as a laptop computer, in the data center. Typically, the dedicated management network is separate from a general data network also connected to the computer hosting the LPAR. The general data network is used by an application executing in the LPAR for ordinary networking purposes, while the dedicated management network is utilized only for managing the computer from the support element. The general data network and the dedicated management network will typically have separate hardware network connections on the computer.

Each LPAR on the computer is operated under a special management program called a hypervisor that resides on the "bare" computer. The hypervisor primarily carries out instruction emulation, memory management, I/O processing, and scheduling for each LPAR. Generally, the support element can communicate with the hypervisor via the dedicated management network, but the support element cannot directly communicate with an LPAR's resources (e.g., its processor, memory, I/O devices, or DASD, etc.). As such, the support element typically cannot write a disk image to an LPAR's DASD. From the opposite perspective, an LPAR typically cannot communicate with the support element or anything else reachable via the dedicated management network, and instead can only communicate with the "outside world" via the general data network.

The creation, deployment, and upgrade of disk images used for booting up LPARs is required in various scenarios, such as the provisioning and managing of systems in a cloud computing environment. The deployment of a disk image, and the upgrade of a disk image, can each be regarded as the installation of a disk image. As stated above, the support element from which an administrator executes and controls all administrative actions, cannot typically access an LPAR's DASD. Instead, the only way to install (i.e., to deploy or to upgrade, etc.) a disk image is to manually provide a new DASD that already contains the desired disk image, assign the new DASD to an LPAR, and reboot the LPAR from the new DASD.

SUMMARY

Embodiments of the present invention provide for a program product, system, and method in which A computer installs an operating system. The computer receives, in a logical partition (LPAR) via a management network, a deploy program configured to download a disk image from an image repository and to write the disk image to a first direct access storage device (DASD) of the LPAR. The disk image includes an operating system, applications, and management components including an upgrade program. The computer receives, in the LPAR via a data network, the disk image, and writes, to the first DASD of the LPAR, the disk image. The computer boots the LPAR into the operating system of the disk image written to the first DASD, and determines whether the installed operating system is a deployment or an upgrade.

DETAILED DESCRIPTION

Descriptions of various embodiments of the invention are herein presented for purposes of illustration, but are not intended to be exhaustive or limited to the embodiments disclosed. Many modifications and variations will be apparent to those of ordinary skill in the art without departing from the scope and spirit of the described embodiments. Terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
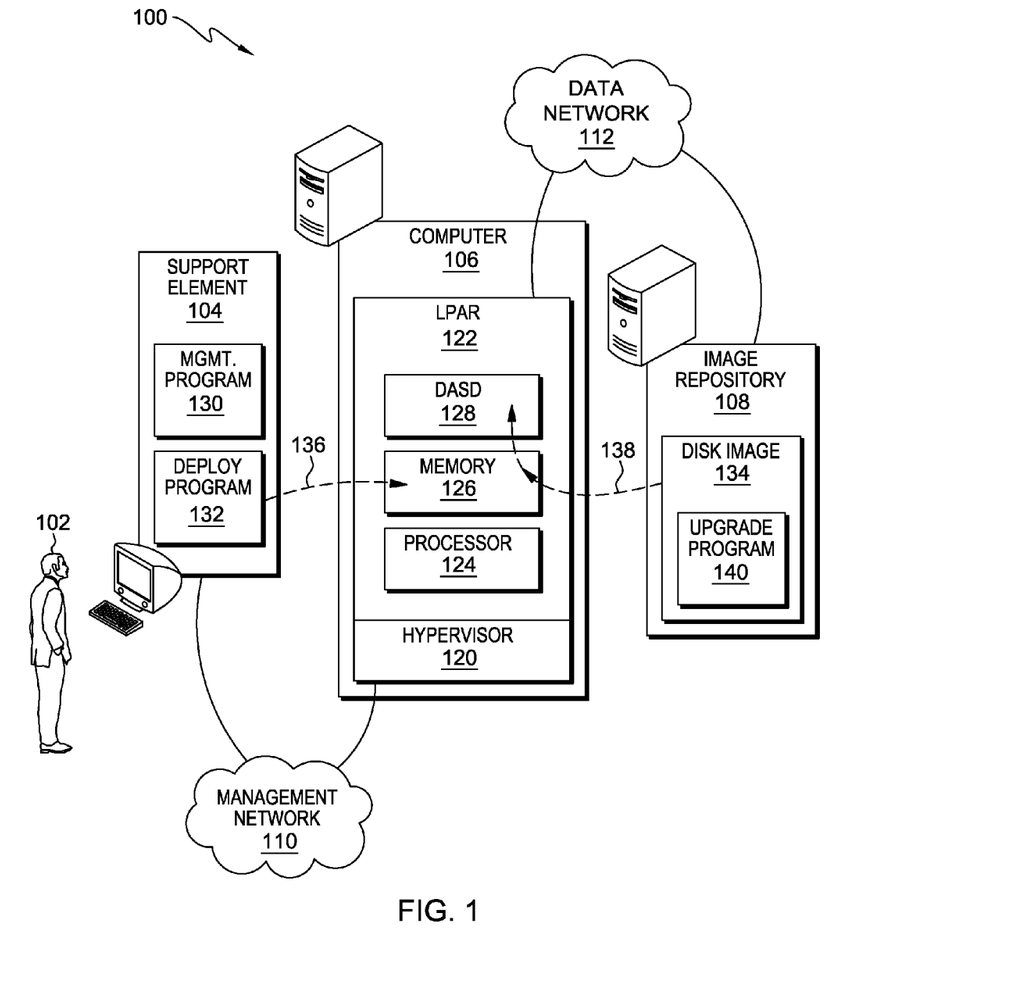
FIG. 1 is a block diagram of a computing environment in accordance with an embodiment of the present invention.

Referring now to FIG. 1, a block diagram of computing environment 100 in accordance with an embodiment of the present invention is shown. Computing environment 100 includes support element 104, computer 106, image repository 108, management network 110, and data network 112. As will be discussed in detail below, the creation, deployment, and upgrade of disk images used by logical partitions ("LPARs") of computer 106 (e.g., LPAR 122, etc.) is managed by support element 104, from which administrator 102 executes and controls administrative actions affecting computer 106, and is aided by image repository 108, which stores disk image 134.

In various embodiments, each one of support element 104, computer 106, and image repository 108 can include a laptop, tablet, or netbook personal computer ("PC"), a desktop computer, a personal digital assistant ("PDA"), a smart phone, a mainframe computer, or a networked server computer. Further, each one of support element 104, computer 106, and image repository 108 can include computing systems utilizing clustered computers and components to act as single pools of seamless resources, or can represent one or more cloud computing datacenters. In particular, computer 106 can be a mainframe computer in a data center of computing environment 100, and can support the creation of an LPAR by the allocation of a processor, memory, dedicated input/output ("I/O") devices, and at least one Direct Access Storage Device ("DASD") that are within or that are physically attached to computer 106. Computer 106 typically includes enough physical resources to support a plurality of LPARs, which are each booted from a DASD. In general, each one of support element 104, computer 106, and image repository 108 can be any programmable electronic device as described in further detail with respect to FIG. 5.

Each one of management network 110 and data network 112 can be, for example, a local area network ("LAN"), a wide area network ("WAN") such as the Internet, or a combination of the two, and can include wired or wireless connections. In general, each one of management network 110 and data network 112 can be any combination of connections and protocols that will support communications via various channels in accordance with an embodiment of the invention. Management network 110 is a dedicated management network for communication between hypervisor 120 of computer 106 and support element 104, while data network 112 is a general data network for communication between LPAR 122 of computer 106 and image repository 108, as well as between LPAR 122 and other network destinations, such as destinations on the Internet.

Support element 104 includes management program 130 and deploy program 132. Management program 130 can aid administrator 102 in the execution and control of administrative actions affecting computer 106, and can also undertake the execution and control of administrative actions automatically, such as according to a predetermined schedule, for example. In particular, management program 130 can perform administration actions affecting computer 106 by sending instructions to hypervisor 120, which carries out instruction emulation, memory management, I/O processing, and scheduling for each LPAR of computer 106 (e.g., LPAR 122, etc.). Management program 130 can instruct hypervisor 120 to set up LPAR 122 by allocating to LPAR 122 processor 124, memory 126, dedicated I/O devices (e.g., a dedicated network connection between LPAR 122 and data network 112, etc.), and DASD 128, that are each within or physically attached to computer 106. Management program 130 can also instruct hypervisor 120 to tear down LPAR 122 by deallocating such resources. Further, as will be discussed in more detail below, management program 130 can transfer deploy program 132 to LPAR 122, where deploy program 132 executes and loads disk image 134 from image repository 108.

FIG. 1 depicts transaction 136 and transaction 138. Transaction 136 can be initiated, for example, by administrator 102, by a predetermined schedule available to management program 130, or upon the receipt by management program 130 of an electronic notice that disk image 134 should be deployed to LPAR 122. During transaction 136, deploy program 132 is transferred by management program 130 to memory 126 of LPAR 122 via management network 110. Deploy program 132, an installation vehicle for disk image 134, can unpack within memory 126 as a RAM disk, and can include an executable that can execute within LPAR 122. In one embodiment, deploy program 132 is bootable, such that after receiving deploy program 132 in memory 126, LPAR 122 is rebooted into deploy program 132. Once executing within LPAR 122, deploy program 132 can access the allocated resources of LPAR 122, including processor 124, memory 126, dedicated I/O devices, and DASD 128. Notably, deploy program 132 thus has greater access to the allocated resources of LPAR 122 than management program 130. This is the case because, executing at the relatively remote location of support element 104, management program 130 can interact with LPAR 122 only via hypervisor 120, and therefore does not have access to, for example, DASD 128.

Following transaction 136, deploy program 132 is executed within LPAR 122. During execution, deploy program 132 initiates transaction 138. Deploy program 132 can initiate transaction 138 by, for example, accessing a link to image repository 108 received from management program 130. In one embodiment, both deploy program 132 and a link to image repository 108 are transferred to memory 126 during transaction 136. During transaction 138, deploy program 132 makes the network interface to data network 112 operational, and then downloads disk image 134 from image repository 108 via data network 112 through memory 126 into DASD 128. While temporarily resident in memory 126, disk image 134 can be processed by deploy program 132 in several ways. For example, in one embodiment, if disk image 134 is compressed for storage on image repository 108, then deploy program 132 can decompress disk image 134 in memory 126 prior to storing disk image 134 on DASD 128. Further, deploy program 132 can also verify (e.g., by cryptographic signature check, or by checksum check, etc.) disk image 134 while disk image 134 is temporarily resident in memory 126. Additionally, prior to storing disk image 134 on DASD 128, deploy program 132 can configure DASD 128 for block-level, or "raw," access.

Disk image 134 is a block-level disk image of an operating system that LPAR 122 can boot into, as well as of applications and management components including upgrade program 140. Disk image 134 is a block-level disk image, rather than a file-level disk image, because DASD 128 typically does not include a filesystem to support receiving a copy of a file-level disk image. Instead, prior to transaction 138 DASD 128 is a bare device, such as a hard disk drive without a filesystem, such that DASD 128 can support receiving only a block-level disk image. After transaction 138, disk image 134 has been written to DASD 128 block by block, such that DASD 128 then includes a filesystem, which includes an operating system that LPAR 122 can boot into, as well as applications and management components including upgrade program 140. The operation of upgrade program 140 will be discussed in more detail in the context of FIG. 2, below.

Disk image 134 can be created and stored on image repository 108 prior to transactions 136 and 138. To create disk image 134, an image is created as a block-level, or "raw," copy of a temporary device to which the contents of the disk image (operating system, applications, and management components such as upgrade program 140) have been copied. The temporary device can be populated with the contents by pulling the contents from one or more additional DASDs on a different, operational LPAR (not shown in FIG. 1). The creation of disk image 134 is addressed in more detail in the context of FIG. 3, below.

After transactions 136 and 138, an operating system included in disk image 134 has been deployed to DASD 128. Upon the restart of LPAR 122, LPAR 122 will boot into the deployed operating system. During the boot up process, the deployed operating system performs a check to determine what kind of installation it is the result of, i.e., to determine whether it is an actual deployment, performed according to the technique described above, or an upgrade, performed according to the technique discussed below. The check can be performed by, for example, checking the value of a deployment or upgrade flag stored in DASD 128. Upon determining that the deployed operating system has resulted from an actual deployment, normal operation ensues. Subsequently, the operating system of LPAR 122 can be upgraded as discussed in detail below.

Figure 2:
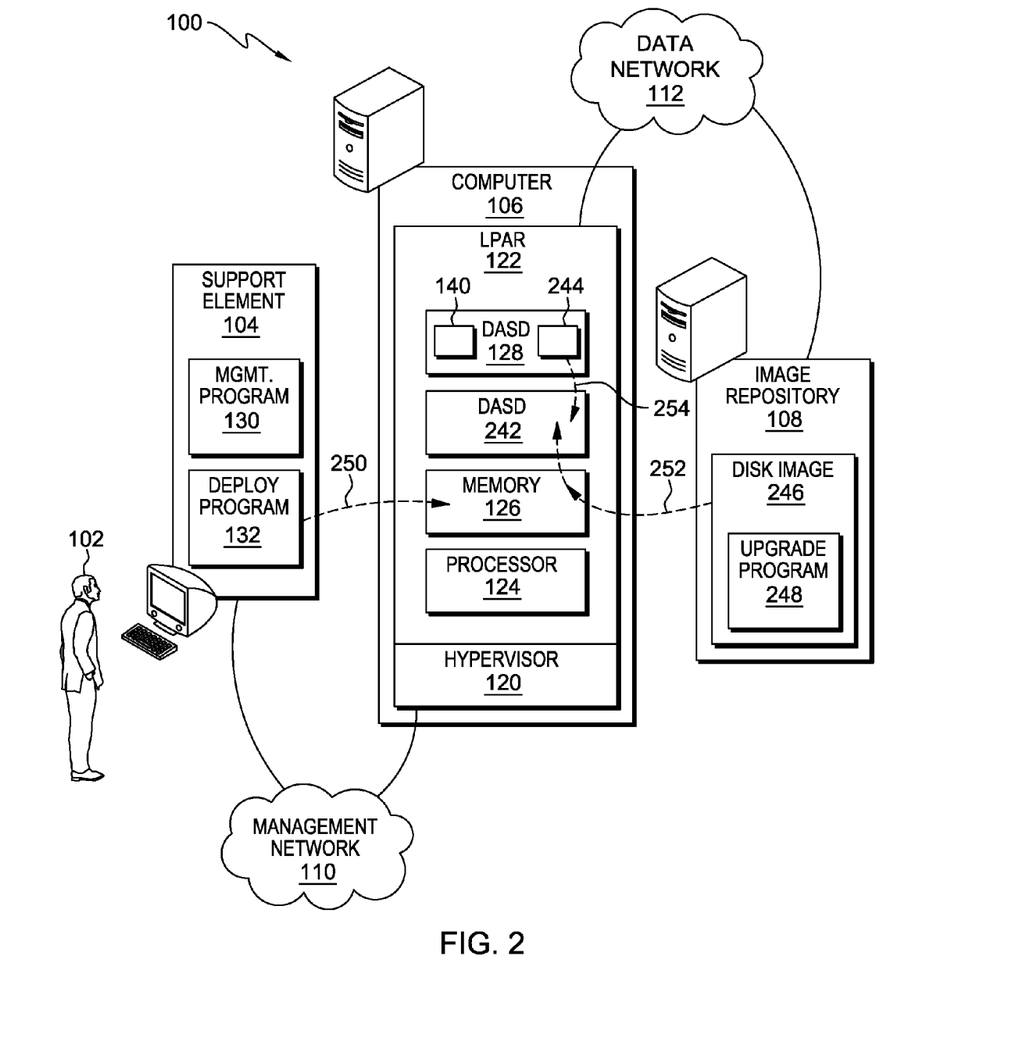
FIG. 2 is a block diagram of a computing environment in accordance with an embodiment of the present invention.

Referring now to FIG. 2, a block diagram of computing environment 100 in accordance with an embodiment of the present invention is shown. Computing environment 100 includes support element 104, computer 106, image repository 108, management network 110, and data network 112. As transactions 136 and 138 have been completed, DASD 128 includes upgrade program 140, which was deployed to LPAR 122 along with the operating system of disk image 134. Image repository 108 includes disk image 246, which is different than disk image 134. For example, disk image 246 can include a new, improved, or otherwise upgraded version of the operating system and applications included in disk image 134. Disk image 246 also includes upgrade program 248, which may be similarly improved with respect to the management components of upgrade program 140. However, in one embodiment, upgrade program 248 may be the same as upgrade program 140, such that the only difference between disk image 246 and disk image 134 is with respect to the operating systems and applications.

In preparation for an operating system upgrade, management program 130 instructs hypervisor 120 to allocate to LPAR 122 additional DASD 242, which is within or physically attached to computer 106, or instructs hypervisor 120 to designate previously-allocated DASD 242 as a DASD that will participate in the upgrade. In one embodiment, management program 130 instructs upgrade program 140 to handle the allocation or designation of DASD 242. Further, management program 130 instructs upgrade program 140 to extract configuration data 244 from the operating system of LPAR 122, in anticipation of transaction 250, transaction 252, and transaction 254. Extracted configuration data 244 includes all settings, preferences, or other configurations that will be preserved during the upgrade, and is stored temporarily on DASD 128.

FIG. 2 depicts transaction 250, transaction 252, and transaction 254. Transaction 250 can be initiated, for example, by administrator 102, by a predetermined schedule available to management program 130, or upon the receipt by management program 130 of an electronic notice that LPAR 122 should be upgraded with disk image 246. During transaction 250, deploy program 132 is transferred by management program 130 to memory 126 of LPAR 122 via management network 110. As discussed above in the context of FIG. 1, after receiving deploy program 132 in memory 126, LPAR 122 is rebooted into deploy program 132.

Following transaction 250, deploy program 132 is executed within LPAR 122. During execution, deploy program 132 initiates transaction 252. Deploy program 132 can initiate transaction 252 by, for example, accessing a link to image repository 108 received from management program 130. Deploy program 132 downloads disk image 246 from image repository 108 via data network 112 through memory 126 into DASD 242. While temporarily resident in memory 126, disk image 246 can be processed by deploy program 132, such as by optional decompression and verification. Prior to storing disk image 246 on DASD 242, deploy program 132 can configure DASD 242 for block-level access.

Disk image 246 is a block-level disk image of an operating system that LPAR 122 can boot into, as well as of applications and management components including upgrade program 248. Disk image 246 can be created and stored on image repository 108 prior to transactions 250, 252, and 254. Disk image 246 is a block-level disk image, like disk image 134, for reasons discussed above in the context of FIG. 1. After transaction 252, disk image 246 has been written to DASD 242 block by block, such that DASD 242 then includes a filesystem, which includes an operating system that LPAR 122 can boot into, as well as applications and management components including upgrade program 248.

After transactions 250 and 252, an operating system included in disk image 246 has been deployed to DASD 242. Upon the restart of LPAR 122, LPAR 122 will boot into the deployed operating system on DASD 242. During the boot up process, the deployed operating system performs a check to determine what kind of installation it is the result of, i.e., to determine whether it is an actual deployment, performed according to the technique described in the context of FIG. 1, or an upgrade, performed according to the technique discussed in the context of FIG. 2. The check can be performed by, for example, checking the value of a deployment or upgrade flag stored in DASD 242. Upon determining that the deployed operating system has resulted from an upgrade, the deployed operating system checks a boot parameter that provides the location of the previous operating system on DASD 128. The boot parameter, as well as the deployment or upgrade flag, can be set by deploy program 132 at the conclusion of transaction 252. Having determined that the deployed operating system has resulted from an upgrade and having checked the boot parameter, the upgrade process continues.

To continue the upgrade process, the operating system of LPAR 122, having just booted up from DASD 242, executes upgrade program 248, also resident on DASD 242. Upgrade program 248 determines the location of the previous operating system, based on the boot parameter, as DASD 128. Upgrade program 248, in transaction 254, retrieves configuration data 244 from DASD 128 and stores it on DASD 242. In particular, the settings, preferences, and other configurations that have been preserved from the previous operating system are migrated and distributed to the newly-deployed operating system and stored on DASD 242 by upgrade program 248. Having completed the upgrade process, normal operation ensues. In one embodiment, DASD 128 is then deallocated from LPAR 122.

Figure 3:
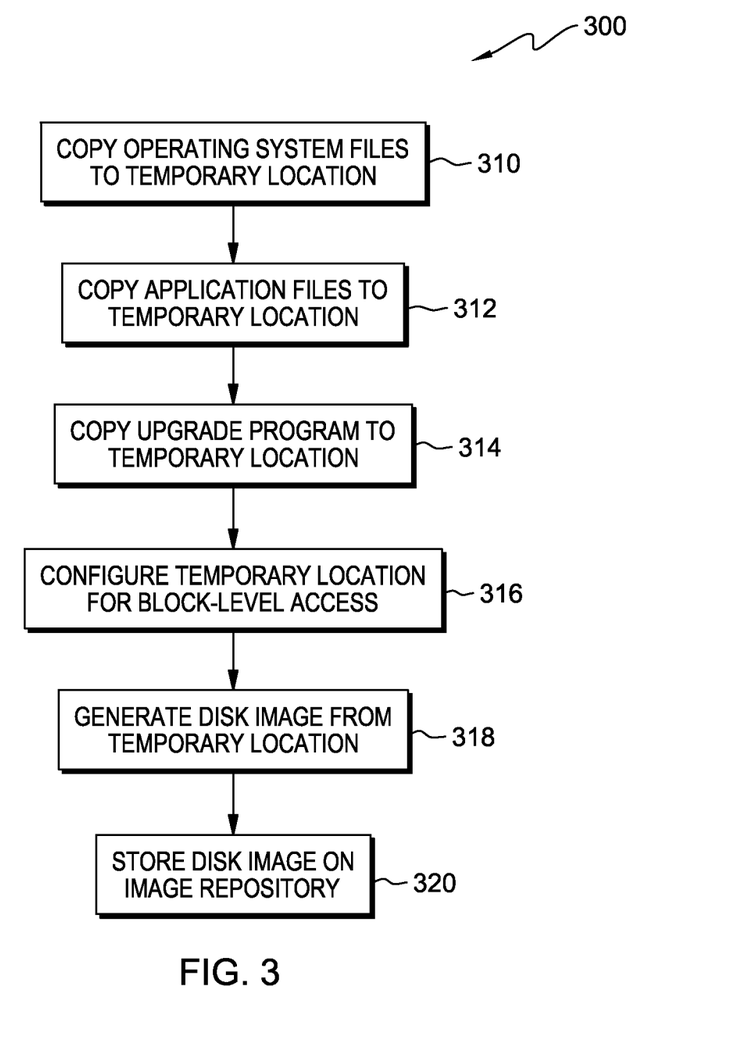
FIG. 3 is a flowchart depicting steps performed to create and store a disk image in accordance with an embodiment of the present invention.

Referring now to FIG. 3, flowchart 300 depicting steps performed to create and store disk image 134 and disk image 246 in accordance with an embodiment of the present invention are shown. In one embodiment, management program 130 performs the following steps. However, in another embodiment, another program, such as a program executing on an LPAR, can perform the steps. In step 310, management program 130 copies operating system files to a temporary location, such as to an available DASD. In step 312, management program 130 copies application files to the temporary location. In step 314, management program 130 copies an upgrade program, such as upgrade program 140 or upgrade program 248, to the temporary location. In step 316, management program 130 configures the temporary location for block-level access. In step 318, management program 130 generates a disk image, such as disk image 134 or disk image 246, from the temporary location. In step 320, management program 130 stores the disk image on an image repository, such as image repository 108.

Figure 4A:
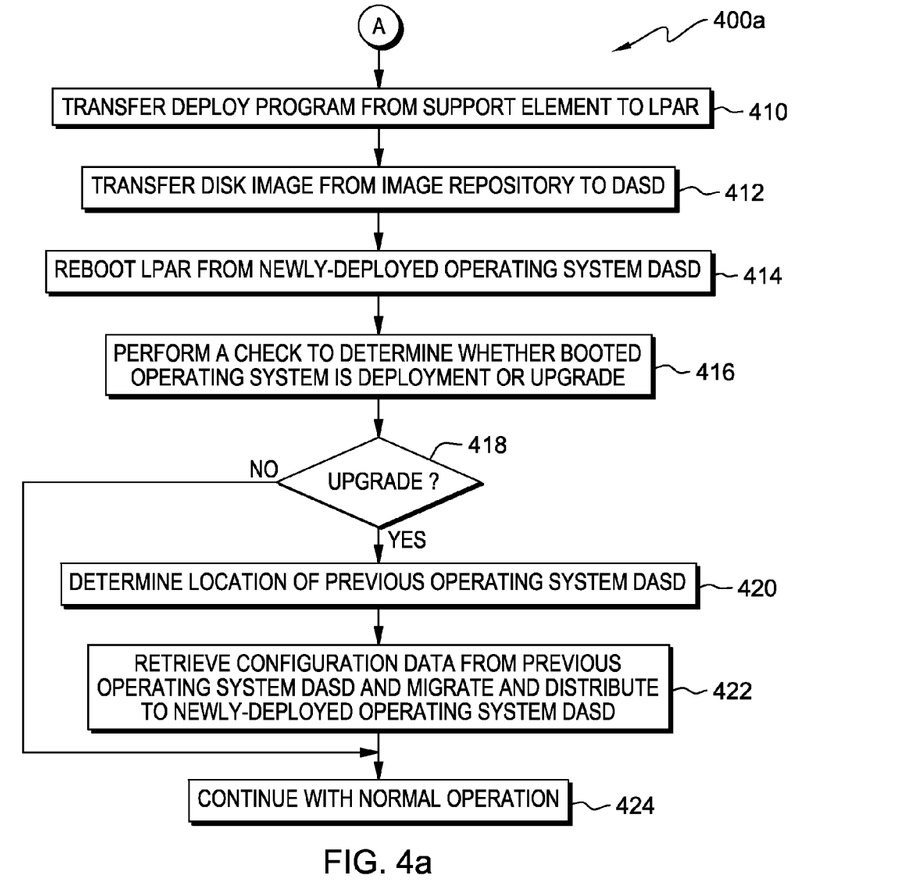
FIGS. 4A and 4B are flowcharts depicting steps followed by a management program, a deploy program, and upgrade programs during one or both of a deployment or upgrade of an operating system in accordance with an embodiment of the present invention.
Figure 4B:
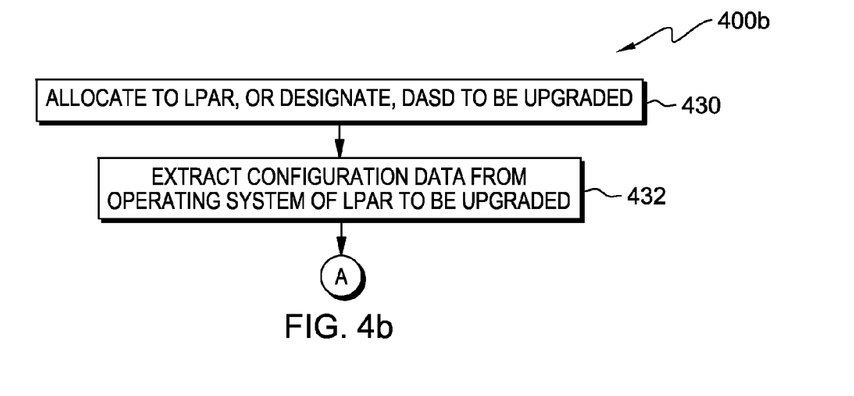

Referring now to FIGS. 4A and 4B, flowcharts 400*a* and 400*b* depicting steps followed by management program 130, deploy program 132, and upgrade programs 140 and 248 during one or both of a deployment or upgrade of an operating system in accordance with an embodiment of the present invention are shown. In the following discussion, an actual deployment will be discussed in the context of flowchart 400*a*. Subsequently, an upgrade will be discussed in the context of both flowcharts 400*b* and 400*a*. A deployment, as well as an upgrade, can each be regarded as an installation, in the context of the techniques introduced herein.

Turning to FIG. 4A, in step 410, management program 130 transfers deploy program 132 from support element 104 to memory 126 of LPAR 122 (transaction 136). In step 412, deploy program 132 transfers disk image 134 from image repository 108 to DASD 128 via memory 126 (transaction 138). In step 414, LPAR 122 is rebooted from the newly-deployed operating system on DASD 128. In step 416, the deployed operating system performs a check to determine what kind of installation it is the result of, i.e., to determine whether it is an actual deployment or an upgrade. In step 418, the deployed operating system determines that it is an actual deployment, and normal operation ensues in step 424.

Turning to FIG. 4B, an upgrade, such as an upgrade occurring after the performance of the steps of flowchart 400*a*, will be discussed. As will be seen, an upgrade includes performance of steps from both flowcharts 400*b* and 400*a*. In step 430, management program 130 allocates additional DASD 242 to LPAR 122, or designates previously-allocated DASD 242 of LPAR 122, in anticipation of the upgrade. In step 432, upgrade program 140 extracts configuration data 244 from the operating system of LPAR 122 on DASD 128, and stores extracted configuration data 244 on DASD 128. Following this, in step 410 of flowchart 400*a*, management program 130 transfers deploy program 132 from support element 104 to memory 126 of LPAR 122 (transaction 250). In step 412, deploy program 132 transfers disk image 246 from image repository 108 to DASD 242 via memory 126 (transaction 252). In step 414, LPAR 122 is rebooted from the newly-deployed operating system on DASD 242. In step 416, the deployed operating system performs a check to determine what kind of installation it is the result of, i.e., to determine whether it is an actual deployment or an upgrade. In step 418, the deployed operating system determines that it is an upgrade. In step 420, the deployed operating system determines the location of the previous operating system on DASD 128. In step 422, upgrade program 248 retrieves configuration data 244 from DASD 128 and migrates and distributes it to the deployed operating system on DASD 242 (transaction 254). Upgrade program 248 can perform additional processing on configuration data 244 in order to make it usable by the deployed operating system. Following this, normal operation ensues in step 424.

Figure 5:
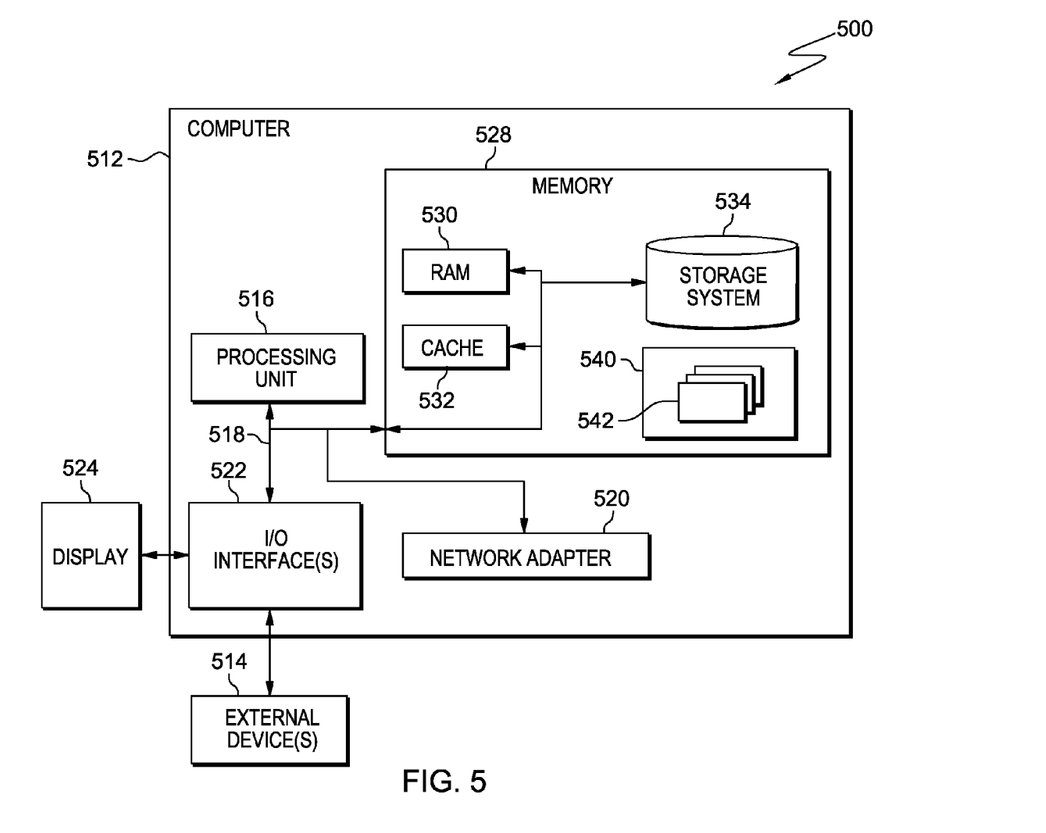
FIG. 5 is a block diagram of a computer system in accordance with an embodiment of the present invention.

Referring now to FIG. 5, a block diagram of a computer system in accordance with an embodiment of the present invention is shown. Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove.

In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of support element 104, computer 106, and image repository 108 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 in computer system 500 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 can include computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program 540, having one or more program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of management program 130, deploy program 132, upgrade program 140, and upgrade program 248 can be implemented as or can be an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication can occur via Input/Output (I/O) interfaces 522. Still yet, computer 512 can communicate with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for installing an operating system, the method comprising:
   providing a management program including a support element and a deploy program having a disk image;
   transferring the deploy program having the disk image from the management program to memory of a logical partition (LPAR);
   receiving in the LPAR the deploy program having the disk image, said deploy program being executable within the LPAR to download the disk image from an image repository and to write the disk image to a first direct access storage device (DASD) of the LPAR, wherein the disk image includes an operating system;
   executing the deploy program within the LPAR, to access allocated resources of the LPAR;
   using said allocated resources, executing the deploy program in the LPAR via a data network, whereby the deploy program initiates a transaction to transfer the disk image from the image repository to the first DASD of the LPAR via said memory of the LPAR;
   writing the disk image including the operating system to the first DASD of the LPAR; rebooting the LPAR from the deploy program's disk image operating system that is written on the first DASD of the LPAR; and
   the operating system written on the first DASD of the LPAR performing a check of itself to determine whether its installation is the result of an actual deployment or an upgrade.

2. The method of claim 1, wherein the disk image is a block-level disk image, and the allocated resources are selected from the group consisting of a processor, memory, dedicated I/O devices, and a second DASD.

3. The method of claim 2, wherein the rebooting the LPAR into the operating system includes rebooting the LPAR from the first DASD so that the LPAR is rebooted into the deploy program.

4. The method of claim 1, wherein the operating system determines that it is said actual deployment if it is not said upgrade.

5. The method of claim 1, wherein the disk image includes an upgrade program configured to extract configuration data in anticipation of an upgrade.

6. The method of claim 5, further comprising:
   migrating the configuration data to a second DASD of the LPAR.

7. The method of claim 1, wherein the receiving the deploy program includes receiving the deploy program from the support element.

8. A non-transitory computer program product for installing an operating system, the non-transitory computer program product comprising:
   one or more non-transitory computer-readable tangible storage media and program instructions stored on at least one of the one or more non-transitory computer-readable tangible storage media, the program instructions comprising:
   program instructions to transfer a deploy program having the disk image from a management program to memory of a logical partition (LPAR);
   program instructions to receive in the LPAR the deploy program having the disk image, said deploy program being executable within the LPAR to download the disk image from an image repository and to write the disk image to a first direct access storage device (DASD) of the LPAR, wherein the disk image includes an operating system;
   program instructions to execute the deploy program within the LPAR to access allocated resources of the LPAR;
   program instructions to execute the deploy program in the LPAR via a data network, whereby the deploy program initiates a transaction to transfer the disk image from the image repository to the first DASD of the LPAR via said memory of the LPAR;
   program instructions to write the disk image including the operating system to the first DASD of the LPAR;
   program instructions to reboot the LPAR from the disk image operating system written on the first DASD of the LPAR; and
   program instructions for the operating system written on the first DASD of the LPAR to perform a check of itself to determine whether its installation is the result of an actual deployment or an upgrade.

9. The non-transitory computer program product of claim 8, wherein the disk image is a block-level disk image, and the allocated resources are selected from the group consisting of a processor, memory, dedicated I/O devices, and a second DASD.

10. The non-transitory computer program product of claim 9, wherein the rebooting the LPAR into the operating system includes rebooting the LPAR from the first DASD so that the LPAR is rebooted into the deploy program.

11. The non-transitory computer program product of claim 8, wherein the operating system determines that it is said actual deployment if it is not said upgrade.

12. The non-transitory computer program product of claim 8, wherein the disk image includes an upgrade program configured to extract configuration data in anticipation of an upgrade.

13. The non-transitory computer program product of claim 12, further comprising: program instructions to migrate the configuration data to a second DASD of the LPAR.

14. The non-transitory computer program product of claim 8, wherein receiving the deploy program includes receiving the deploy program from a support element.

15. A system for installing an operating system, the system comprising: one or more processors, one or more computer-readable memories, one or more computer readable tangible storage devices, and program instructions stored on at least one of the one or more storage devices for execution by at least one of the one or more processors via at least one of the one or more memories, the program instructions comprising:
   program instructions to transfer a deploy program having the disk image from a management program to memory of a logical partition (LPAR);

program instructions to receive in the LPAR the deploy program having the disk image, said deploy program being executable within the LPAR to download the disk image from an image repository and to write the disk image to a first direct access storage device (DASD) of the LPAR, wherein the disk image includes an operating system;

program instructions to execute the deploy program within the LPAR to access allocated resources of the LPAR;

program instructions to execute the deploy program in the LPAR via a data network, whereby the deploy program initiates a transaction to transfer the disk image from the image repository to the first DASD of the LPAR via said memory of the LPAR;

program instructions to write the disk image including the operating system to the first DASD of the LPAR;

program instructions to reboot the LPAR from the disk image operating system written on the first DASD of the LPAR; and program instructions for the operating system written on the first DASD of the LPAR to perform a check of itself to determine whether its installation is the result of an actual deployment or an upgrade.

16. The system of claim 15, wherein the disk image is a block-level disk image, and the allocated resources are selected from the group consisting of a processor, memory, dedicated I/O devices, and a second DASD.

17. The system of claim 16, wherein the rebooting the LPAR into the operating system includes rebooting the LPAR from the first DASD so that the LPAR is rebooted into the deploy program.

18. The system of claim 15, wherein the operating system of the LPAR determines that it is said actual deployment if it is not said upgrade.

19. The system of claim 15, wherein the disk image includes an upgrade program configured to extract configuration data in anticipation of an upgrade.

20. The system of claim 19, further comprising:

program instructions to migrate the configuration data to a second DASD of the LPAR.

* * * * *